(12) United States Patent
Blue et al.

(10) Patent No.: US 11,893,415 B2
(45) Date of Patent: Feb. 6, 2024

(54) SYSTEM AND METHOD FOR PROCESS AND DATA OBSERVATION IN A NETWORKED SERVICE ENVIRONMENT

(71) Applicant: Q2 Software, Inc., Austin, TX (US)

(72) Inventors: Adam David Blue, Austin, TX (US); Theodor Getu Berhane, Austin, TX (US); Thomas Coyne, Austin, TX (US)

(73) Assignee: Q2 Software, Inc., Austin, TX (US)

( * ) Notice: Subject to any disclaimer, the term of this patent is extended or adjusted under 35 U.S.C. 154(b) by 312 days.

(21) Appl. No.: 17/322,255

(22) Filed: May 17, 2021

(65) Prior Publication Data
US 2021/0389983 A1    Dec. 16, 2021

Related U.S. Application Data

(60) Provisional application No. 63/037,429, filed on Jun. 10, 2020, provisional application No. 63/037,434, filed on Jun. 10, 2020.

(51) Int. Cl.
*G06F 9/46* (2006.01)
*G06F 9/48* (2006.01)

(52) U.S. Cl.
CPC ............ *G06F 9/4881* (2013.01); *G06F 9/465* (2013.01); *G06F 9/466* (2013.01)

(58) Field of Classification Search
CPC ......... G06F 9/4881; G06F 9/465; G06F 9/466
See application file for complete search history.

(56) References Cited

U.S. PATENT DOCUMENTS

| | | | |
|---|---|---|---|
| 10,805,323 B1* | 10/2020 | Varda | H04L 63/145 |
| 11,157,609 B1* | 10/2021 | Gerraty | G06F 21/44 |
| 2004/0268317 A1 | 12/2004 | Gouriou et al. | |
| 2008/0022281 A1 | 1/2008 | Dubhashi et al. | |
| 2013/0347095 A1 | 12/2013 | Barjatiya | |
| 2017/0237682 A1 | 8/2017 | Xue et al. | |
| 2020/0364150 A1* | 11/2020 | Breslow | G06F 12/1036 |
| 2021/0389982 A1 | 12/2021 | Blue et al. | |

OTHER PUBLICATIONS

International Search Report and Written Opinion issued for PCT Application No. PCT/US2021/032745, dated Aug. 17, 2021, 9 pages.

Knight, "Network Isolation and Segmentation Explainer," AT&T Cybersecurity (Jan. 8, 2020) [retrieved on Jul. 12, 2021 from «https://cybersecurity.att.com/blogs/security-essentials/demystifying-network-isolation-segmentation»].

International Preliminary Report on Patentability, issued for PCT Application No. PCT/US2021/032745, dated Dec. 22, 2022, 8 pages.

* cited by examiner

*Primary Examiner* — Tammy E Lee
(74) *Attorney, Agent, or Firm* — Sprinkle IP Law Group

(57) ABSTRACT

Embodiments as disclosed herein provide computing systems and methods that effectively serve to isolate processes in a computing environment. The isolation of such processes may serve additionally to substantially increase the observability of such processes, allowing a granular insight into data associated with those processes and the performing of individual tasks.

21 Claims, 9 Drawing Sheets

SYSTEM AND METHOD FOR PROCESS AND DATA OBSERVATION IN A NETWORKED SERVICE ENVIRONMENT

RELATED APPLICATIONS

This application claims a benefit of priority under 35 U.S.C. § 119 to U.S. Provisional Patent Application No. 63/037,429 filed Jun. 10, 2020, entitled "SYSTEM AND METHOD FOR PROCESS AND DATA ISOLATION IN A NETWORKED SERVICE ENVIRONMENT," and U.S. Provisional Patent Application No. 63/037,434 filed Jun. 10, 2020, entitled "SYSTEM AND METHOD FOR PROCESS AND DATA OBSERVATION IN A NETWORKED SERVICE ENVIRONMENT," which are hereby fully incorporated by reference in its entirety.

TECHNICAL FIELD

This disclosure relates generally to computer security. Specifically, this disclosure relates to the isolation and observation of processes in a computing environment. In particular, this disclosure relates to the isolation and observability of processes in a networked service environment. Even more particularly, this disclosure relates to embodiments of systems and methods for isolating requests, and their servicing, in a multitenant environment, and increasing the observability of processes executing these requests.

BACKGROUND

An emerging information technology (IT) delivery model is the web services model, by which shared resources, software or information are provided to computers other devices, or other requestors (e.g., applications) on an on-demand basis over a network (such as the Internet). Thus, a service or a web service generally refers to computing services hosted on a computer platform that allow client computer systems (thin clients, portable computers, smart-phones, desktop computers and so forth), or applications thereon, to access these hosted computing services over a network (the Internet, for example). In many cases, such web services are provided in the context of cloud computing. A cloud computing service thus generally refers to a web service that is hosted in a cloud computing environment or on a cloud computing platform. In this manner, web services architectures, may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.).

Cloud computing and web services are often implemented according to a multitenant architecture by which software and its supporting architecture serves multiple (e.g., distinct) groups of users of the services offered by a services platform. Implementing services in a multitenant environment (e.g., in a cloud-based environment), however, becomes challenging. In this environment, there are multiple tenants that may access the same set of services. For a variety of reasons, it is desirable to isolate the servicing of these requests, not only between tenants, but in many cases between requests from the same tenant. These reasons may include reasons associated with security (e.g., the maintenance of segregation between data or operations associated with individual tenants) or observability (e.g., such that the services associated with implementing those tenants requests may be effectively analyzed, billed, etc.).

Accordingly, it is desirable to have the ability to effectively isolate and observe processes in a computing environment.

SUMMARY

To address the aforementioned desires, among other ends, embodiments as disclosed herein may provide computing systems and methods that effectively serve to isolate processes in a computing environment. The isolation of such processes may serve additionally to substantially increase the observability of such processes, allowing a granular insight into data associated with those processes and the performing of individual tasks. Specifically, embodiments as disclosed herein may provide a task handler that serves to isolate processes (e.g., in a service platform) by using the fork and exec model for creating new processes in an operating system to handle incoming workload (e.g., requests for services). The structure of embodiments of such a computing system may therefore comprise three parts 1) a parent (e.g., process)—responsible for startup, initialization, triggering the creation of child processes (children), and administering those children; 2) tasks—units of code to execute work for various purposes (e.g., the servicing of a request for a service received at the services platform); and 3) one or more child processes—a process created by forking the parent process with the intent of performing requested work (e.g. one or more tasks) and then exiting.

Embodiment of a parent process may be adapted to initially receive requests for tasks (e.g., generally some processing, including for accomplishing a service or portion of a service offered by the computing system). These requests may be received, for example, through a communication interface such as a web services interface, Application Programming Interface (API) or another type of interface (e.g., provided by the computing system). For example, while running, the parent process can receive incoming socket requests. These socket requests may include, for example, socket requests associated with service requests received over a network. When such a socket is received the parent process does not read from the socket. Instead the parent process may accept the socket request and fork a child process, handing off the unread socket (e.g., associated with the received request) to the forked child process. The parent process can then close any socket created during acceptance of the incoming socket request.

According to embodiments, when a forked child process starts, the child may read from the socket handed off by the parent and parse the incoming request (e.g., from the read socket) to identify the requested task and accomplish the incoming request (e.g., a request for a service offered by the service platform). Performing the requested task may, for example, entail identifying a task associated with the request and calling (e.g., sending a request to a location associated with the task or passing the request to the task) or otherwise invoking the task (e.g., code to accomplish the task). The child process thus can serve as a "wrapper" for the executed task for the request, providing error handling and communication to the parent, route identification data and data about the task (such as performance and resource telemetry) to the parent.

The parent process can receive messages from the children. For example, the parent process can receive such messages via an out-of-process communication (e.g., a UDP socket sent from a child process to the parent process). Such a communication from a child process may include data regarding the child and the associated task such as, for example, an execution state of a child, the resources used by the child during execution of the child, or statistics about the child process. The parent can record this data about the child in the tracking structure associated with the child including for example, recording the run time associated with the child process, the task route utilized by the child process, or statistics associated with the process (e.g., memory usage statistics, I/O statistics or timing statistics, among others).

Accordingly, embodiments as disclosed may have a number of advantages. As one extremely important advantage, each socket and associated request (e.g., for a service provided by a service provider platform) is read only in the child process (e.g., the parent only accepts the socket connection and passes the unread accepted socket connection to the child), so full isolation of incoming data into distinct operating system process spaces is maintained. Similarly, each request executes in a child process that lives only for the duration of the request. Thus, the substantially immediate exit of the child process after completion of the child process minimizes or eliminates garbage collection that would be present, for example, in a multi-threaded mode. By using a parent process that forks and manages child processes, the parent process observes, and can terminate, child processes that exceed an allowable runtime (e.g., in contrast a single process cannot reliably terminate itself if it runs too long)

The use of a separate process space for the execution of a child process for a request allows for a request to use the entire available resource set. In some instances (e.g., utilizing Python), this capability means each request can consume a full core on a multicore machine (e.g., unlike multithreading). Moreover, the use of a separate process space eliminates any impact of thread deadlocking, memory consumption, garbage collection or other operational runtime issue in one request from impacting another request, since each request has its own process space. Additionally, because each request executes in a distinct process space, kernel-level resource accounting becomes available for CPU, memory, handles and I/O.

Embodiments may also increase the granularity at which the execution of specific tasks or requests may be tracked and observed. Specifically, each child process can obtain or determine data on that specific child process for tracking and observability of that child process in the parent process. This data may be data associated with the child process from the beginning to the end of the lifetime of the child process. Because the only code executing in that child process is code specific to that particular task for a particular request, it is possible to measure with very fine granularity the independent execution (e.g., the statistics or other data) related only to that request/task. Thus, in some embodiments, each individual execution of (e.g., a request for) a service may be associated with a specific (e.g., one and only one) process and process lifetime. Thus, embodiments can determine exactly the amount of resources that a particular execution of the task required.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIGS. 4A and 4B are diagrams illustrating one embodiment of an interface presenting observed data on child processes for a task.

DETAILED DESCRIPTION

Figure 1:
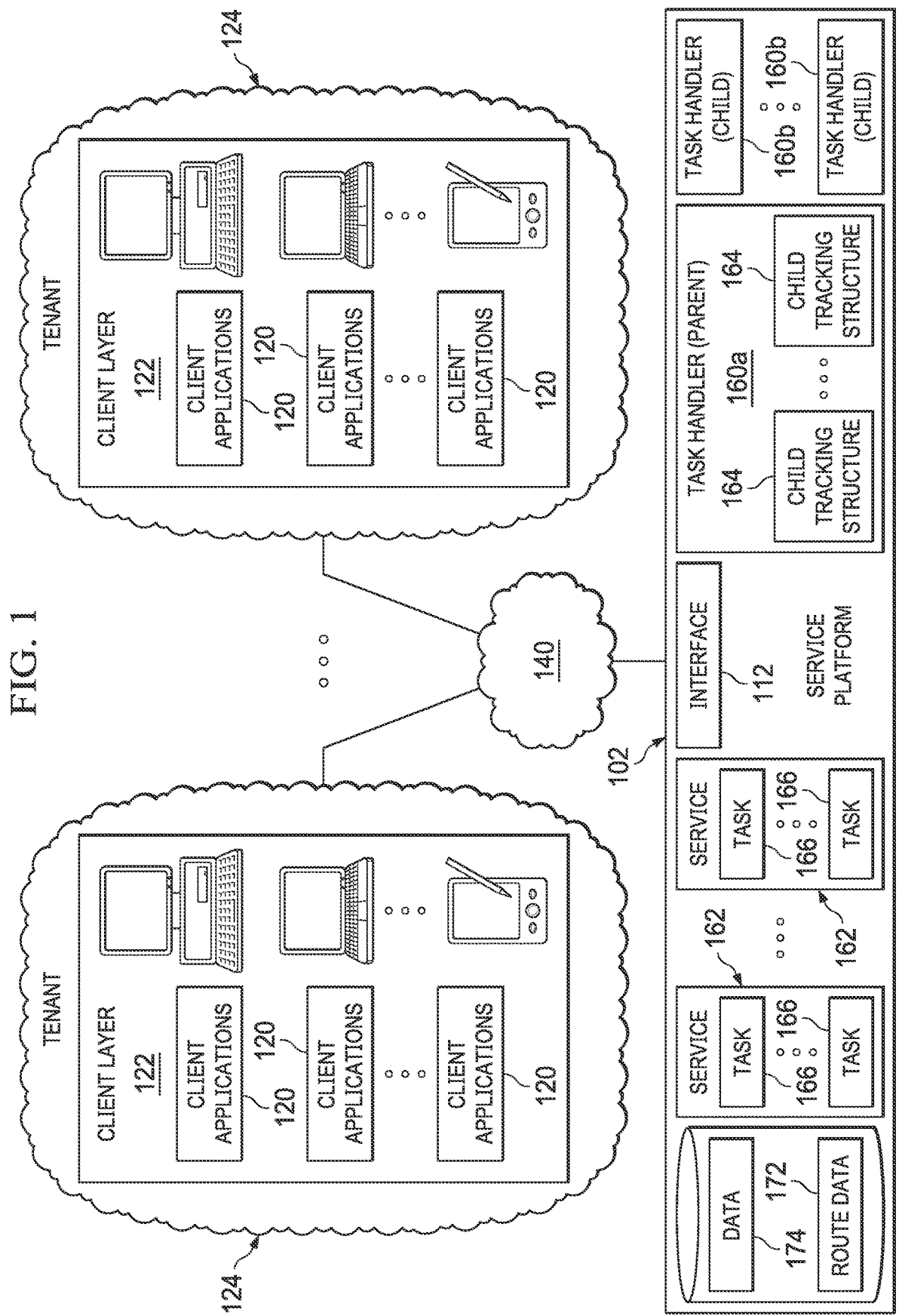
FIG. 1 is a block diagram depicting an environment including a multitenant services platform utilizing an embodiment of a task handler.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Before describing embodiments in more detail, some context may be useful to an understanding of such embodiments. An emerging information technology (IT) delivery model is the web services model, by which shared resources, software or information are provided over a network such as the Internet to computers and other devices on-demand. Thus, a service or a web service generally refers to a computer platform that allows client computer systems (thin clients, portable computers, smartphones, desktop computers and so forth), or applications thereon, to access hosted computing services over a network (the Internet, for example). In many cases such web services are provided in the context of cloud computing. A cloud computing service thus generally refers to a web service that is hosted in a cloud computing environment or on a cloud computing platform. In this manner, web services architectures, may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.).

Cloud computing and web services are often implemented according to a multitenant architecture by which software and its supporting architecture serves multiple (e.g., distinct) groups of users of the services offered by a services platform. Implementing services in a multitenant environment (e.g., in a cloud-based environment), however, becomes challenging. In this environment, there are multiple tenants that may access the same set of services. For a variety of reasons, it is desirable to isolate the servicing of these requests, not only between tenants, but in many cases between requests from the same tenant.

Embodiments as disclosed herein may thus provide a task handler that serves to isolate processes in a service (or other type of) platform by using the fork or exec model for creating new processes in an operating system to handle incoming workload (e.g., requests for services). The structure of embodiments may therefore comprise three parts 1) a parent (e.g., process)—responsible for startup, initialization, triggering the creation of child processes (children), and administering those children; 2) tasks—units of code to execute work created for various purposes (e.g., the servicing of a request for a service received at the services platform); and 3) one or more child processes—a process created by forking the parent process with the intent of performing requested work (e.g. tasks) and then exiting.

Turning first to the parent, when a parent process (e.g., a parent process instance of the task handler) is started it may initialize the set of tasks that may be processed by the service platform. These tasks may comprise, for example, the services (or portions of those services). This initialization may include the loading of the libraries (e.g., code) for those tasks into memory of the system (e.g., virtual or physical computing platform on which the service platform is implemented) and may also include determining and loading routes (e.g., network locations of code paths, etc.) associated with each of the tasks as well. Moreover, when the parent process initializes it may create a tracking structures (e.g., such as a process map or the like) for observing and managing child processes. These tracking structures may include, or utilize, for example, tracking objects for child process that may be used to track data associated with those child processes, such as a process identifier associated with the child process, a run time associated with the child process, a task route utilized by the child process, or statistics associated with the process, including for example, memory usage statistics, I/O statistics or timing statistics, among others. The parent process can then begin listening on the network for incoming work (e.g., requests through a services interface), administrative requests and messages from forked child processes.

While running, the parent process can receive incoming socket requests. These socket requests may include, for example, socket requests associated with service requests received over a network. When such a socket is received the parent process does not read from the socket. Instead the parent process may accept the socket request and fork a child process, handing off the unread socket to the forked child process. The parent process can then close any socket created during acceptance of the incoming socket request.

When the parent forks a child process, the parent adds the forked child to the list of children to manage (e.g., to the tracking structure maintained by the parent process for the purpose of tracking and managing child processes). The parent can periodically examine the list of extant children according to a child check time and make determinations for those children, including, for example, if any children have completed execution (with error or normally) or if any children have exceeded their allowable lifetime, or to perform other maintenance on a list of active child processes. The parent process can also determine a number of active children for use in load shaping (e.g., determining if there are too many active child processes to process an incoming request) and the execution state of a child.

The parent process can receive messages from the children via an out-of-process communication channel (e.g., a UDP socket sent from a child process to the parent process). Such a communication from a child process may include an execution state of a child, data on the resources used by the child during execution of the child, or statistics about the child process. The parent process can then record this data about the child in the tracking structure associated with the child including for example, recording the run time associated with the child process, a task route utilized by the child process, or statistics associated with the process (e.g., memory usage statistics, I/O statistics, or timing statistics, among others). The parent process may also capture administrative messages on an administrative channel (e.g., from an administration tool), including for example, messages instructing the parent process to shut down or to reload or update data used by the task handler (e.g., the parent process or child processes).

Thus, while running, the parent process can receive incoming socket requests (e.g., associated with service requests received over a network). The parent process does not read from the socket but instead may accept the socket request and fork a child process, handing off the unread socket to the forked child process. When such a forked child process starts, the child may read from the socket handed off by the parent process and parse the incoming request (e.g., from the read socket) to identify the requested task by means of a route (e.g., a Uniform Resource Identifier) to accomplish the incoming request (e.g., a request for a service offered by the service platform). The child can then invoke the task using the identified route. The child process can thus serve as a "wrapper" for the executed task, providing error handling and communication to the parent, route identification data to the parent and performance and resource telemetry to the parent (e.g., through the aforementioned out-of-process communication such as a UDP socket sent from a child process to the parent process).

Accordingly, embodiments as disclosed may have a number of advantages. As one extremely important advantage, each socket and associated request (e.g., for a service provided by a service provider platform) is read only in the child process (e.g., the parent only accepts the socket connection and passes the unread accepted socket connection to the child), so full isolation of incoming data requests, and their servicing, into distinct operating system process spaces is maintained. Similarly, each request, and the associated servicing, may execute in a child process that lives only for the duration of the request. Thus, the substantially immediate exit of the child process after completion of the child process minimizes or eliminates garbage collection that would be present, for example, in a multi-threaded mode. By using a parent process that forks, and manages, child process the parent process observes, and can terminate, child processes that exceed an allowable runtime (e.g., in contrast, a single process cannot reliably terminate itself if it runs too long)

As another advantage, the use of a separate process space for the execution of a child process for a request allows for the servicing of the request to use the entire available resource set. In some instances (e.g., utilizing Python) this capability means each request can consume a full core on a multicore machine (e.g., unlike multithreading).

The use of a separate process space may also improve, or simplify, the development or implementation of services or tasks in such an environment. As there may be no need for locking or unlocking of data structures or mutexes to control access to such data, the programming model for the development of such services or tasks may be greatly simplified, as the developer of such services or task does not need to concern themselves with such issues when developing such services or tasks.

Moreover, the use of a separate process space eliminates any impact of issues with respect to one request (e.g., such as thread deadlocking, memory consumption, garbage collection or other operational runtime issue) from impacting another request, since each request has its own process space. Additionally, because each request executes in a distinct process space, kernel-level resource accounting becomes available for CPU, memory, handles, input/output (I/O) and other data tied to the request.

It will therefore be understood that while embodiments herein may be described in the context of, and may be useful when utilized with, a multitenant web services provider, such embodiments are provided without loss of generality as other embodiments may be equally effectively utilized in the context of single tenant or proprietary services platforms, and more generally in almost any computing system that needs or desires to isolate and observe individual processes.

Moving then to FIG. 1, a diagrammatic representation of one embodiment of an architecture for a multitenant service platform is depicted. The multitenant service platform may be deployed on a proprietary platform or servers or may, for example, be deployed on a cloud platform. Here, a services platform 102 provides one or more services 162 that may be accessed through an interface 112, which may be a Representational State Transfer (REST) or other interface accessed over a network. It will be noted that the services platform 102 may comprise one of multiple services platforms that may be deployed to cooperatively implement the multitenant service platform. Each of these services platforms 102 may include its' own instance of task handler 160 handling requests for associated service 162, where these services 162 may be different or the same across each of the services platforms 162. Such service platforms 102 may, for example, each be deployed in a container deployed in a cloud computing platform.

Client devices may access services platform 102 over a network 140, which may be a LAN, WAN, the Internet, a cellular network, or other type of wired or wireless network. Client devices may include a variety of device types including, but not limited to, personal computers, workstations, smart phones, laptop computers, or other computer devices operable to access data from services platform 102. It should be understood that a system may include any number of servers and clients without loss of generality. These client devices may be associated with different entities 124 or "tenants" that utilize services platform 102.

Thus, various client applications 120 (usually remote) in a client layer 122 may request services 162 offered by services platform 102 using the interface 112 offered by the services platform 102. In some cases, these client applications 120 may be proprietary client applications executing on a user client's computing device associated with, or provided by, the provider of the services platform 102, may be browser-based interfaces provided by the provider of the services platform 102 or may be other types of client applications. For example, a user at a client device may access a certain location (e.g., Universal Resource Locator (URL)) associated with the services platform 102 using a browser and a browser-based application for accessing the services 162 may be provided.

As the user interacts with a client application 120 (or more generally as the client application 120 operates), requests for various services 162 provided by the services platform 102 may be sent by the client application 120, received through the interface 112, and the service platform 102 may take appropriate actions. As these requests may come from different client applications 120 associated with different tenants 124 of the services platform 102 it is desirable to isolate the data and processes involved in the servicing of such service requests from one another. Additionally, it may be desirable to compartmentalize or sandbox the handling of individual requests themselves (e.g., even in instances where the requests are associated with the same tenant).

To those ends, among others, service platform 102 may include task handler 160 that serves to isolate processes in service platform 102 by using the fork or exec model for creating new processes in the operating system of the services platform 102 to handle incoming workload (e.g., requests for services). The task handler 160 may include parent portion or code (e.g., a set of modules or functions) for executing a parent process 160a and a child portion or code (e.g., a set of modules or functions) for executing in a child process 160b. Accordingly, one (e.g., an initial) executing instance of task handler 160a may execute the parent code and serve as the parent process responsible for startup, initialization, triggering the creation of child processes (children) 160b, and administering those children 160b. These new process may thus be child processes 160b forked from the parent task handler 160a, which may, for example, be forked with a child entry point associated with the child code of the task handler 160 for a starting execution point of the child process 160b.

Thus, when parent task handler instance 160a is started it initializes a set of tasks 166 that may be processed by the service platform 102, comprising the services 162 (or portions of those services) offered by the service platform 102. This initialization may include the loading of the libraries (e.g., code) for those tasks into memory of the services platform 102 and may also include determining and loading routes 172 (e.g., network locations of code paths, etc.) associated with each of the service 162 as well.

The initialization may also include loading any desired data 174 into the process space of the parent task handler instance 160a (e.g., storing it in a data structure associated with the parent task handler instance 160a) such that this data 174 will be passed to (e.g., available in the process space of) any subsequent child processes 160b forked from the parent process 160a. Such desired data 174 may include, for example, keys or other security related data which may be used in the context of the services platform 102.

Moreover, during initialization the parent process 160a creates a tracking structure 164 (e.g., such as a process map or the like) for observing and managing child processes 160b. These tracking structures 164 may include, or utilize, for example, tracking objects for child process that may be used to track data associated with those child processes 160b.

The parent task handler instance 160a can then listen on the network for incoming work (e.g., socket connections requests associated with requests services interface 112), administrative requests, or messages from child processes.

When the parent task handler instance 160a receives an incoming socket request the parent process does not read from the socket. Instead the parent process 160a may accept the socket request and fork a child process 160b, handing off the unread socket to the forked child process. The parent task handler instance 160a then closes any socket created during acceptance of the incoming socket request.

When the parent task handler instance 160a forks a child process 160b, the parent 160a adds the forked child to the list of children to manage (e.g., to a tracking structure 164 maintained by the parent process for the purpose of tracking and managing child processes). The parent task handler instance 160a can periodically examine the list (e.g., tracking structure 164) of extant child processes 160b according to a child check time and make determinations for those children 160b, including, for example, if any children 160b have completed execution (e.g., with error or normally), if any children 160b have exceeded their allowable lifetime or perform other maintenance on child processes 160b or associated structures. The parent task handler instance 160a can also determine a number of active children 160b for use in load shaping (e.g., determining if there are too many active child processes to process an incoming request) and the execution state of a child 160b.

When a forked child process starts (e.g., a child task handler instance 160b), the forked child process 160b may start executing the child code of the task handler 160. Thus, the child 160b may read from the socket handed off by the parent task handler instance 160a and parse the incoming request (e.g., from the read socket) to identify the requested task 166 (e.g. implementing service 162) by means of a route to accomplish the incoming request (e.g., a request for a service 162 offered by the service platform 102). The child 160b can then invoke the task 166 using the identified route. The child task handler process 160b thus can serve as "wrapper" for the executed task 166 (e.g. implementing service 162), providing error handling and communication to the parent task handler instance 160a, route identification data to the parent task handler instance 160a and performance and resource telemetry to the parent task handler instance 160a (e.g., through the aforementioned out-of-process communication, such as a UDP socket sent from a child process to the parent process).

The parent task handler instance 160a receive these messages from the children 160b via the out-of-process communication channel (e.g., a UDP socket sent from a child task handler process 160b to the parent task handler instance 160a). Such a communication from a child process 160b may include an execution state of a child 160b, the resources used by the child 160b during execution of the child, or statistics about the child process 160b. The parent task handler instance 160a can then record this data about the child 160b in the tracking structure 164 associated with the child 160b including for example, recording the run time associated with the child process 160b, the task route utilized by the child process 160b, or statistics associated with the child process 160b (e.g., memory usage statistics, I/O statistics, or timing statistics, among others).

At certain points, it may be desirable to update data 174 utilized by the parent task handler instance 160a and the child processes 160b. For example, when security data such as keys or the like utilized by the service platform 102 are update it may be desired to provide these updated keys to the parent task handler instance 160a and child processes 160b such that these process can utilize the current keys in inter-process communication or the like. More specifically, when such data 174 is updated it is desirable that running instance of the parent task handler instance 160a and subsequent children processes 160b be updated without having to restart or otherwise stop execution of the parent task handler instance 160a.

Accordingly, in certain embodiments, when such data 174 (e.g., a key structure or the like) is updated on the service platform 102, a signal may be provided to the parent task handler instance 160a. Such a signal may be, for example, a UNIX user signal such as SIGUSR1 or SIGUSR2. These signals may be generated based on a user interaction with an administrative interface (e.g., indicating that data 174 has been updated) or may be algorithmically generated by service platform 102 (e.g., when data 174 is updated) or an orchestration framework within which the service platform 102 may be executing. Task handler 160 may include signal handler code for handling such signals. In particular, task handler 160 may have signal handler code adapted to reload such data 174 when such a signal (e.g., a SIGUSR1 signal) is received. Thus, when parent task handler instance 160a receives such a signal the signal handler code of the parent task handler instance 160a may reload data 174 (e.g., the key structure or the like). By reloading this data 174 into the parent process (e.g., by storing it in a data structure of the parent task handler instance 160a) that data 174 will also be passed to (e.g., available in the process space of) any subsequent child processes 160b forked from the parent process 160a. In this manner, all subsequent children 160b can be updated with the data 174 solely by virtue of having the parent task handler instance 160a reload the data 174 without requiring the parent task handler instance 160a to be restarted or halted for an extended period of time.

It may now be useful to illustrate in more detail one particular embodiment for the operation of a task handler that utilizes the fork or exec model for creating new processes in the operating system of a services platform to handle incoming workload. For purposes of discussion of such a task handler it will be useful to describe an embodiment of such a task handler implemented in Python executing on Linux or another Unix based platform (e.g., Macintosh OSX or the like). It will however be understood that this description is provided by way of example without loss of generality, and other embodiments may be effectively implemented using other languages and operating systems.

Figure 2A:
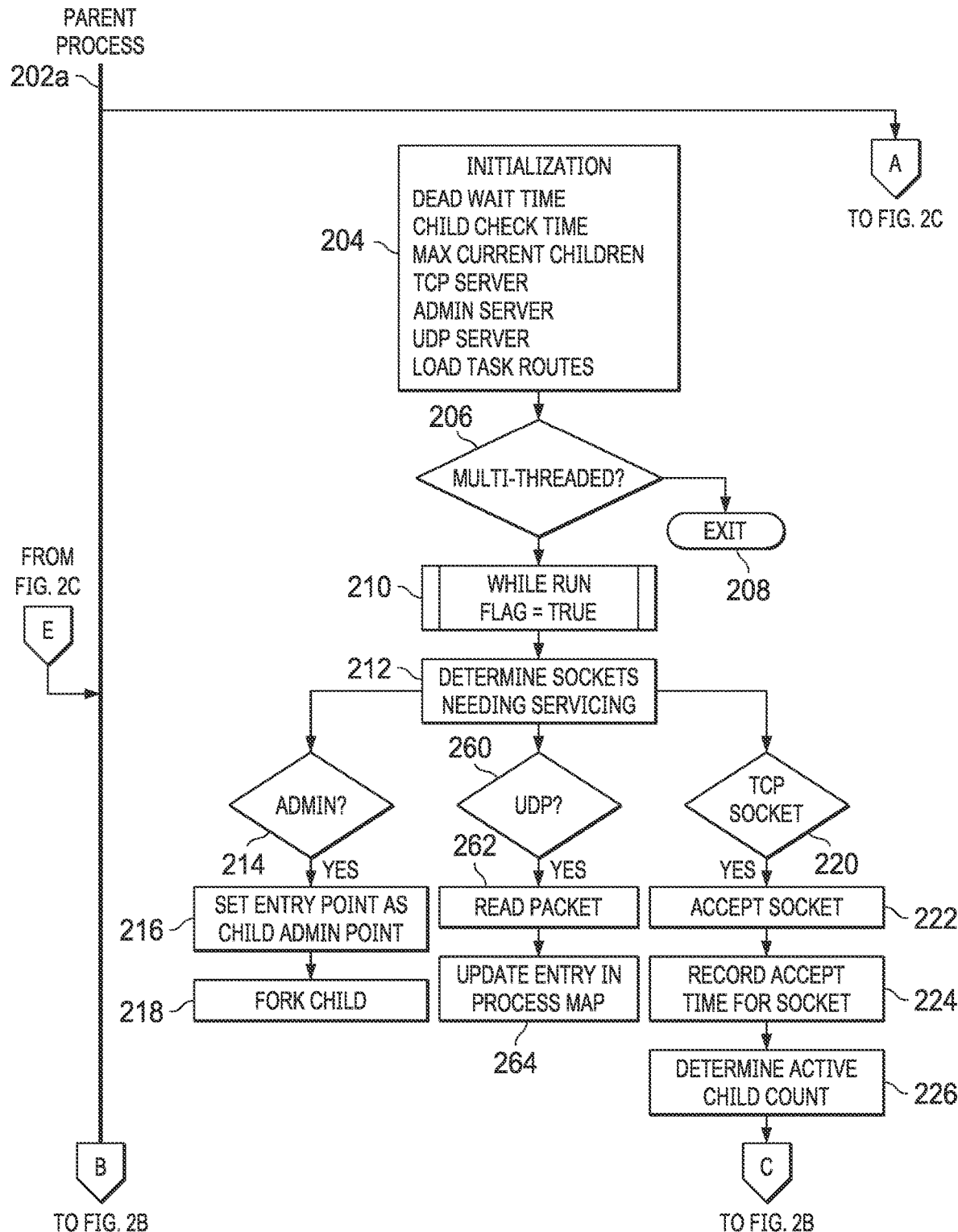
FIGS. 2A, 2B and 2C are block diagrams depicting the operation of one embodiment of a task handler.
Figure 2B:
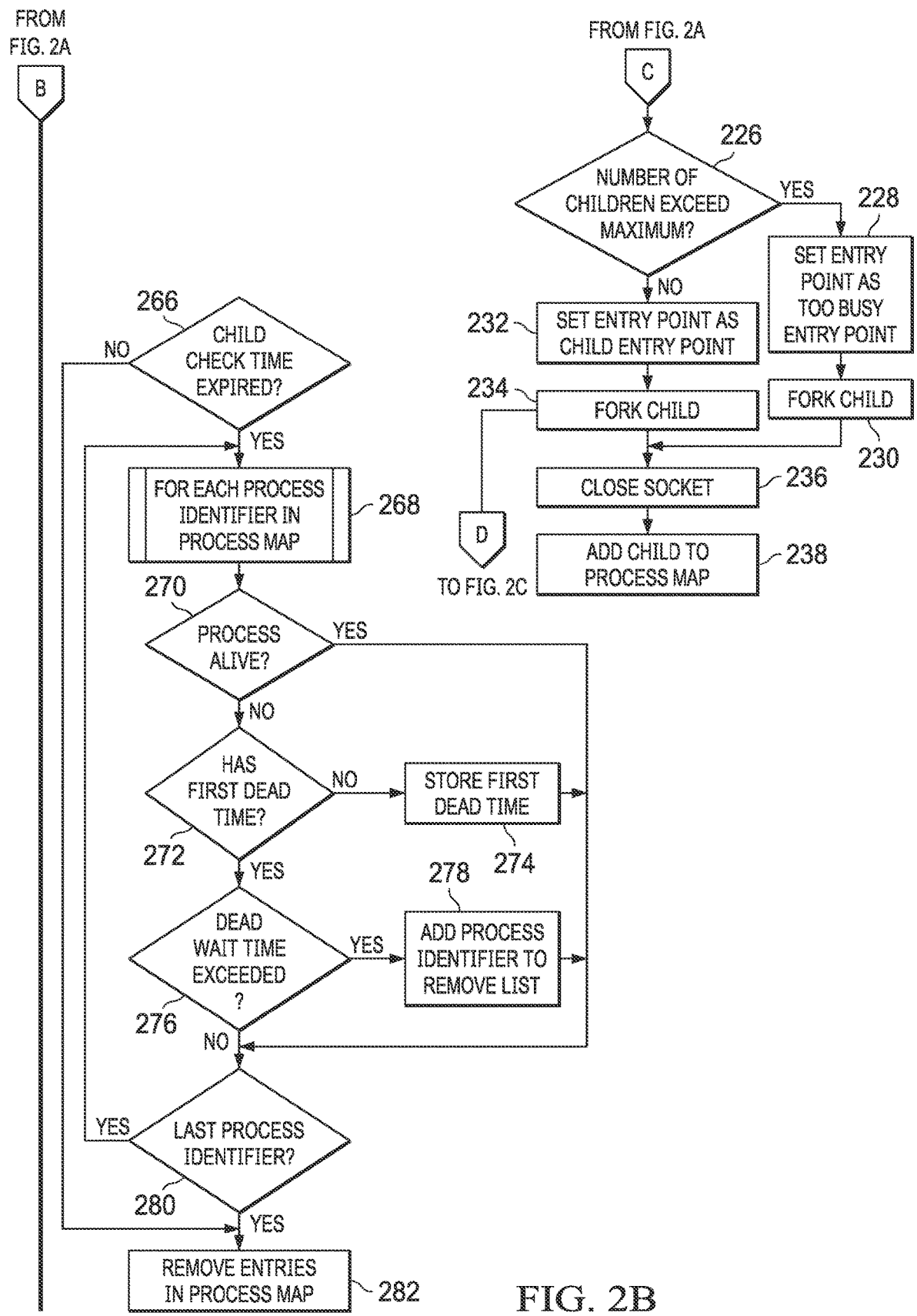
Figure 2C:
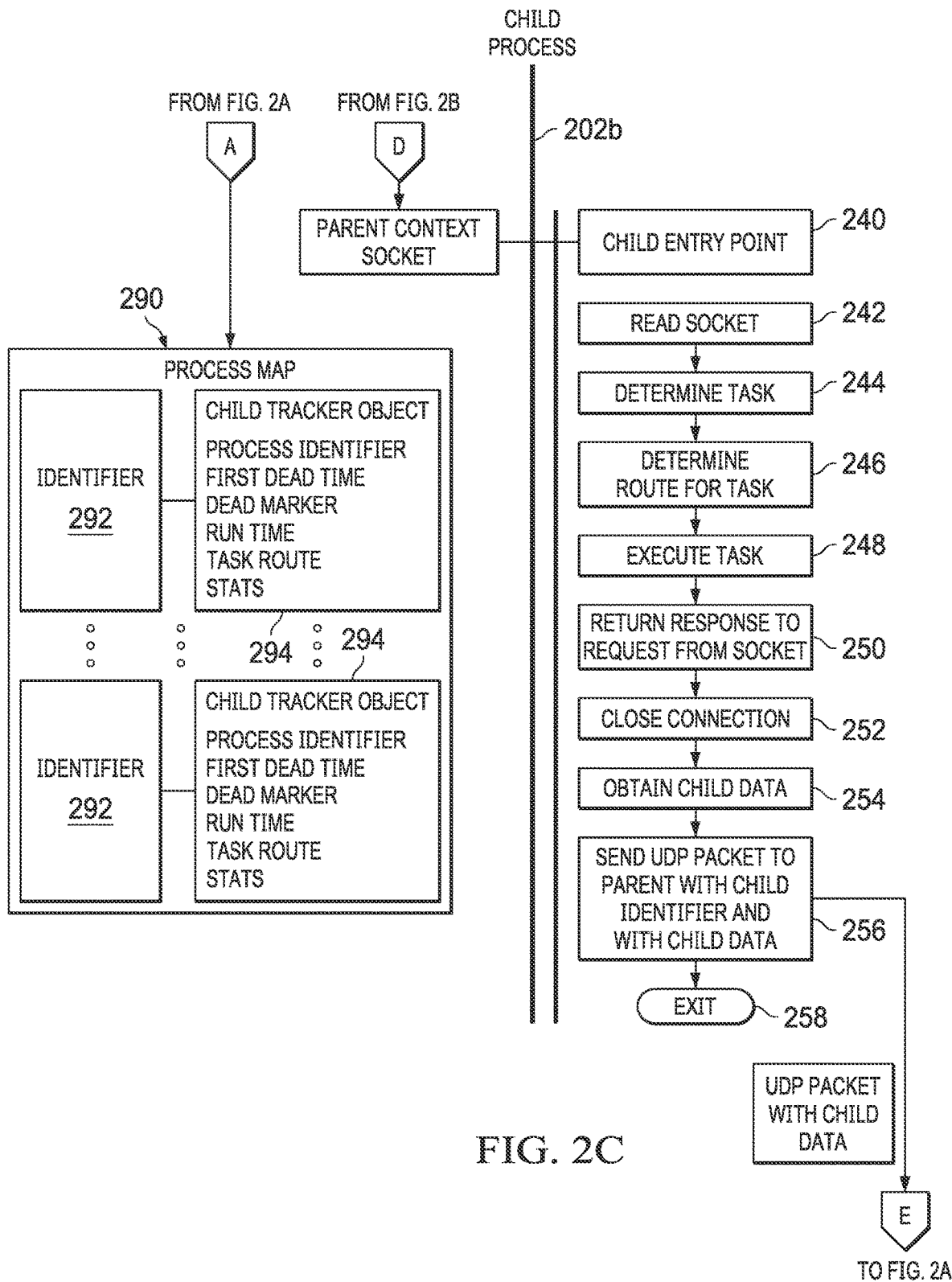

Looking now at FIGS. 2A, 2B and 2C then, the operation of one embodiment of a task handler is depicted. In the operating system environment of the platform on which the task handler is set to be executed, the multiprocessing mode for the Python multiprocessing model may be set to a bare fork, as what is desirable in embodiments may be an operating system level fork without any offered management (e.g., Python fork management). The task handler may include both parent portion (e.g., parent code) for executing in a parent process and a child portion (e.g., child code) for executing in a child process. Thus, the child code and the parent code are both in the task handler, however the parent code may never be called in a forked child process of the task handler and the child code may never be called in a parent process instance of the task handler.

The child code may be associated with a child entry point. The child entry point is a point (e.g., location in the code) in the task handler associated with the child code at which a child process for task handling should start executing. The child code may also be associated with a too busy entry point, which is a point in the task handler associated with the child code at which a child process for task handling should start executing when a number of extant child process is over some threshold. Similarly, the task handler may include administrative code for executing in a child process for handling administrative tasks. The administrative code may be associated with an administrative entry point which is a point in the task handler associated with the administrative code at which a child process for administrative task handling should start executing.

Accordingly, an initial instance of a task handler may be executed (e.g., invoked using an administrative tool or the like). This initial instance of the task handler may service as the parent process 202a (the parent instance) of the task handler. Thus, when the task handler (e.g., the first instance of the task handler) is first started the parent code of the task handler may execute. When parent process 202a begins execution it may perform an initialization (STEP 204). This initialization may initialize a number of variables or thresholds that may be utilized during execution of the parent process 202a (or a child process created by the parent process 202a). These thresholds may include, for example, a dead wait time, which is a time that may be utilized for confirmation of a dead (e.g., completed or otherwise not executing) child process to avoid race conditions or the like; a child check time (e.g., 750 milliseconds or the like) which is a time interval at which to determine or update a status of child processes; and a maximum number of current children that may be utilized to determine whether a child process should be invoked to handle an incoming request (e.g., which may be 100 children or the like). Such thresholds or other parameters may be read, for example, from a configuration file on the service platform.

The parent process 202a may then create three sockets (e.g., socket servers). The first may be a work socket (server) which may be a (e.g., Transmission Control Protocol (TCP)) listening socket for the primary workload for servicing requests for the platform server. A second created socket may be an administrative socket (server) that is a socket utilized for system management tasks and a third socket (server) that will be an inter-process communication channel for receiving communications. This inter-process socket may be, for example, a User Datagram Protocol (UDP) socket.

The initialization of the parent process may also initialize and load the tasks (or services) for the platform server. This initialization may include the loading of the libraries (e.g., code) for those tasks into memory of the system (e.g., virtual or physical computing platform on which the service platform is implemented) and may also include determining and loading routes (e.g., network locations of code paths, etc.) associated with each of the tasks as well. As this initialization task may execute once in the parent process 202a this means that these tasks may already be loaded and immediately ready to execute in any forked child process essentially immediate after those child processes are forked (e.g., because at fork time the code for these tasks has already been loaded, as any forked child is a copy of the parent process 202a).

Moreover, when the parent process initializes it may create a tracking structure (e.g., such as a process map 290 or the like) for observing and managing child processes. These tracking structures may include, or utilize, for example, tracking objects 294 for child process that may be used to track data associated with those child processes, such as a process identifier associated with the child process, a run time associated with the child process, a task route utilized by the child process, or statistics associated with the child process, including for example, memory usage statistics, I/O statistics, or timing statistics, among others. Such a process map 290 may be, for example, a dictionary or array structure having an index comprising an identifier 292 for a child process associated with a corresponding tracking object 294 (child tracker object) for the associated child process.

The parent process 202a can then determine if there is only one thread executing or if the parent process 202a is executing in multi-threaded environment (STEP 206). This check may be implemented because, in most cases, multi-threaded processes cannot be consistently forked. The parent process 202a may exit in the event that there is more than one thread in the parent process 202a (STEP 208). This check may be to ensure that the task handler always uses fork and is not multi-thread.

The task handler (e.g., the parent process 202a) may operate while a flag is set to true and may shut down when the flag is set to false (e.g., by an administrative tool). Thus, while the run flag is set to true or the parent process 202a is otherwise operating (STEP 210), the parent process 202a may listen (e.g., check) on any of the established socket servers to determine if any sockets need servicing, including for requests on the TCP work socket (e.g., associated with requests received through a services interface), administrative requests received on the administrative channel, and packets from any child processes on the UDP server socket (STEP 212).

If there is a socket on the administrative channel (Yes branch of STEP 214), the parent process 202a may accept the socket and set a fork entry point for a child as the administrative entry point (STEP 216). The parent process 202a can then fork a child process to handle the requested administrative task, handing the accepted socket for the administrative request to the forked child process and closing the accepted socket (STEP 218). This administrative task handling child process (not shown) can then execute the administrative code of the task handler to read the socket and handle the administrative task specified.

If there is a socket on the work (e.g., TCP) channel (Yes branch of STEP 220), the parent process 202a may accept the socket (STEP 222). This may involve, for example, receiving a syn packet and the parent process 202a returning a syn ack packet. The parent process 202a can then record an accept time for the accepted socket (STEP 224) and determine if the number of currently running child processes exceeds the number of maximum allowable children process (STEP 226). This determination may be made, for example, based on the length (e.g., number of entries) of a process map 290 for tracking currently executing children (e.g., which may have an entry for each currently executing child process). In some embodiments, the number of currently executing child processes determined from the process map 290 may be adjusted, for example, by a count of a number of process that have likely exited but that have not yet removed from the process map 290 (e.g., based on identifiers for processes whose data was received on the inter-process communication channel (e.g., UDP socket), but for which the corresponding child process may still be alive and in the process map 290).

If the number of currently executing child processes exceeds the maximum allowable number of child process (e.g., 100), the fork entry point for a child may be set as a too busy entry point (Yes branch of STEP 226 and STEP 228). The parent process 202a can then fork a child process for the too busy task, handing the accepted socket for the work request to the forked child process and closing the accepted socket (STEP 230). This too busy task handling child process (not shown) can then handle sending a too busy response in response to that work request. Once the parent process 202a forks the child process for the request, a child tracking object 294 for the child process 202b may be added to the process map 290 using a corresponding child process identifier 292 (STEP 238). Such a child process identifier may be, for example, a unique identifier associated with the child process such as a process identifier (e.g., pid), a globally unique identifier (GUID) or another assigned or obtained identifier for the child process. Any data known on the process, such as a process identifier (e.g., pid), a socket accept time or any other data that may be obtained or determined about the child process can be updated in the child tracking object 294 associated with that child process in the process map 290.

Specifically, in one embodiment, the busy task portion (e.g., code) associated with the too busy entry point of the task handler is pre-built code run at initialization of the process, where this busy task code may return a too busy message (e.g., a 503 message) in response to the request on the accepted socket handed to the child process. So, in such cases the task handler handles the request received from a client for a service by responding with a denial, but does so in a manner that is outside the parent process 202a (e.g., so the parent process 202a can go back to processing). Note that this manner of handling requests in a busy environment is a marked improvement over multi-threaded servers where there may be an execution of a large portion of code without any insight into the level of activity in the other threads, as it is difficult, if not impossible to do process management from inside a single process.

Figure 3:
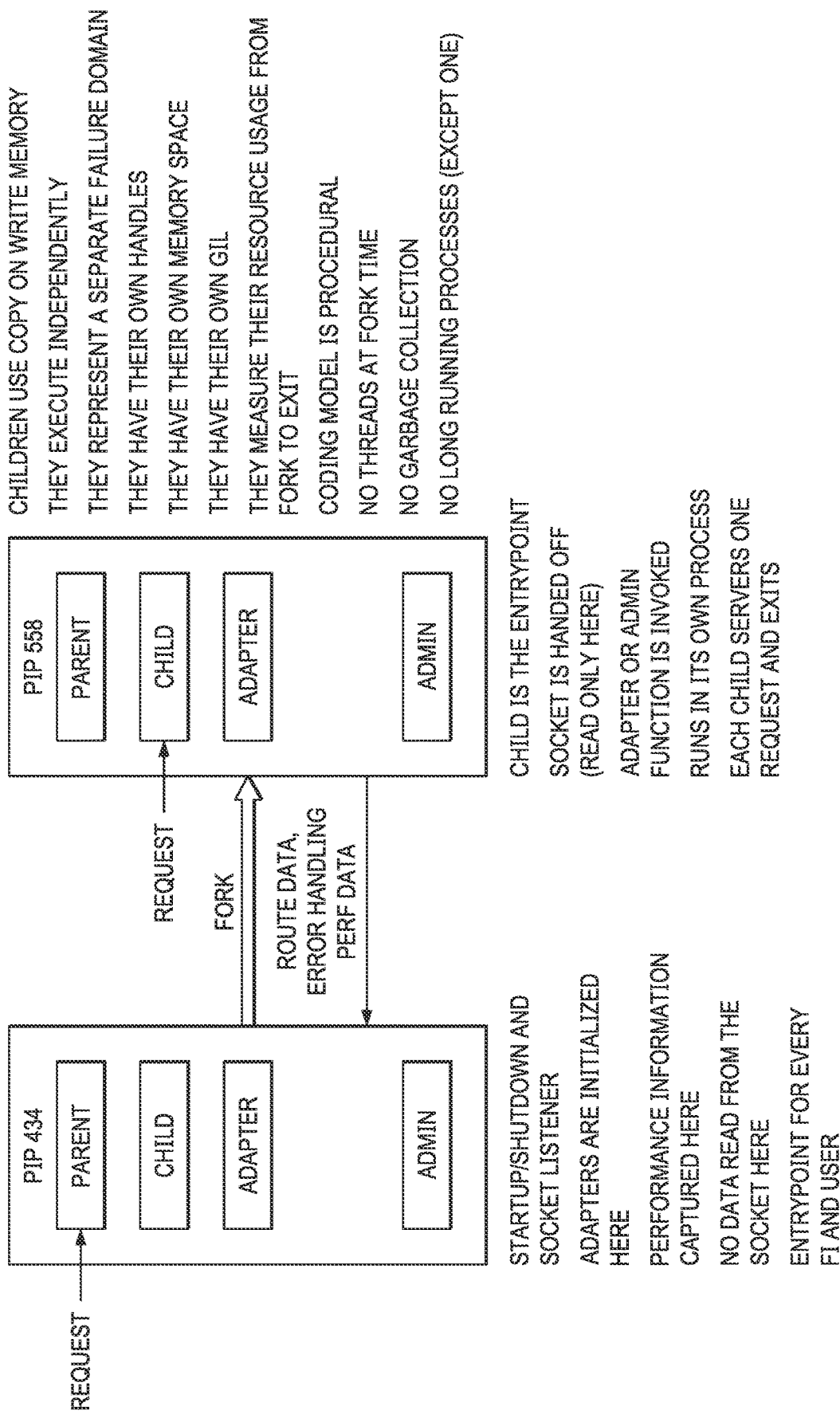
FIG. 3 is a block diagram illustrating the forking of a process according to an embodiment of a task handler.

If the number of currently executing child processes does not exceed the maximum allowable number of child process, the fork entry point for a child may be set as the child entry point for task handling (NO branch of STEP 226 and STEP 232). The parent process 202a can then fork a child process 202b (e.g., including initializing and starting the child process 202b) to handle the requested task (e.g., the requested service) and hand (e.g., pass) the accepted socket for the request to the forked child process (STEP 234). FIG. 3 is a block diagram illustrating the forking of a process according to an embodiment of a task handler.

Returning to FIGS. 2A, 2B and 2C, notice here that in the parent process 202a there are no socket reads. The parent process 202a just calls accept on the socket to accept the connection, handing the socket off to the forked child process 202b starting execution at the child entry point. The parent process 202a can then close the accepted socket (STEP 236) (e.g., because after fork there may be two connections to the socket). In this manner, all reads of the socket may be accomplished in the child process 202b, maintaining isolation of the parent process 202a from any data associated with the socket or processing the request, and spawning a single process (e.g., child process 202b) corresponding to the handling of just that request.

Once the parent process 202a forks the child process 202b for the request, a child tracking object 294 for the child process 202b may be added to the process map 290 using a corresponding child process identifier 292 (STEP 238).). Such a child process identifier may be, for example, a unique identifier associated with the child process such as a process identifier (e.g., pid), a globally unique identifier (GUID) or another assigned or obtained identifier for the child process. Any data known on the child process 202b, such as a process identifier (e.g., pid), a socket accept time or any other data that may be obtained or determined about the child process 202b can be updated in the child tracking object 294 associated with that child process 202b.

Accordingly, the forked child process 202b is a separate process that is a copy of the parent process. Since parent process 202a has previously initialized before forking the child process 202b (e.g., loading libraries or other code for execution of tasks and routes for these tasks) tasks are already loaded and ready to execute before the parent 202a forks. Thus, for tasks hat have any initialization steps these initialization steps may have been accomplished before the child process 202b is forked, such that the task will not need to initialize and may be called immediately, and furthermore alleviating the child process 202b from being involved or consuming processing time in the loading or initialization of such tasks. Being able to do the initialization and have all the code loaded means any forked child process 202b may be substantially immediately ready to run those tasks after they are forked. This means that every child process forked for every task may be forked with the code for accomplishing that task already initialized and loaded, resulting in substantial performance improvements.

The child process 202b may start execution at the child entry point 240 associated with the child code of the task handler. The child process 202b may thus include (or be passed) the context of the parent process 202a and may be provided, in one embodiment, with an object or identifier associated with the parent process 202. The child process 202b is also provided the socket (e.g., associated with a request for a service) that was accepted (but not read) in the parent process 202a. If needed, a logger for logging process data may be reset to the child process 202b (e.g., if it was initially set to the parent process 202a before the parent process 202a forked the child process 202b) or any additional sockets that were open in the parent process 202a may be closed.

The child code of the child process 202b can then read the socket that was passed to the child process 202b by the parent process 202a when the child process 202b was forked (STEP 242). The child process 202b may validate the request read from the socket so the child process 202b may take appropriate remedial action if the request is malformed (e.g., such a returning an error in response to the client that issued the request). The child process 202b can then determine the task being requested in association with the read socket and an associated route for handling the requested task (STEPS 244, 246). As this task routes may have been loaded by the parent process 202a during initialization, the routes may be substantially immediately available in the context of the process space of the child process 202b.

Specifically, the child process 202b may parse the incoming request (e.g., from the read socket) to identify the requested task by means of a route (e.g., a URI) to accomplish the incoming request (e.g., a request for a service offered by the service platform). The child process 202b can then execute the task using the identified route (STEP 248). The child process 202b thus can serve as "wrapper" for the executed task such that the task is executed within the context of the child process 202b. The response to the request (e.g., resulting from the execution of the task at STEP 248) can then be returned in response to the request (read from the socket in the child process 202b) (STEP 250) and the (e.g., work) socket passed by the parent closed (STEP 252). Note that the response to the received request for the task (e.g., service) is sent (e.g., directly) from the child process 202b (e.g., to the requesting client) and does not pass through (e.g., is not sent from) the parent process 202a. Thus, after forking the child process 202b the parent process 202a may not be involved in any handling of the request.

Once the task has been executed (STEP 246) and the response to the request returned (STEP 250), the child process 202b may close the connection associated with the socket provide by the parent process 202a (STEP 252). The child process 202b can then obtain or determine data on the child process 202b for tracking and observability of the child process 202b in the parent process 202a (STEP 254). Specifically, this data may be data associated with the child process 202b from the beginning to the end of the lifetime of the child process 202b. Because the only code executing in that child process 202b is code specific to that particular task for a particular request, it is possible to measure with very fine granularity the independent execution (e.g., the statistics or other data) related only to that request or task. Thus, in some embodiments, each individual execution of (e.g., a request for) a service may be associated with a specific (e.g., one and only one) process and process lifetime. Thus, embodiments can determine exactly the number or amount of resources that particular execution of the task required.

Specifically, in certain embodiments the child process 202b may determine data on the child process 202b such as a run time or an exit message, or may obtain data associated with the child process 202b on memory statistics, I/O statistics, time statistics, resource telemetry, etc. from one or more operating system calls or file system accesses such as /dev or /proc in Linux. This data may include data on the process obtained from, for example, /proc/[pid of child process]/stat, /proc/[pid of child process]/io, /proc/[pid of child process]/status, /proc/[pid of child process]/mem, or other /dev or /proc sources. Examples of data that may be obtained from such calls is included in the Appendix.

Once the child process 202b obtains such data on the child process 202b, the child process 202b may send a packet to the parent process 202a with the obtained data on the child process 202b and exit (STEPS 256, 258). This packet may include the obtained child data and an identifier for the child process. For example, the data obtained on the process may be concatenated into a single string or separated with one or more separation tokens and included in a UDP packet that is sent to the parent process 202a on the inter-process communication channel (e.g., the UDP socket server initialized by the parent process 202a). The sending of this UDP packet may be accomplished, in one embodiment, by sending the UDP packet to a loopback address (e.g., 127.0.0.1) on a UDP port for the UDP server established by the parent process 202a. It will also be noted here that this inter-process communication channel may be utilized by the child process 202b to send other data to the parent process 202b, such as if there is an error, or when it is determined what route has been utilized to service a request, or almost any other data that is desired to communicate or track about the child process 202b in parent process 202a. By including a child process identifier for the child process 202b in such an inter-process communication (e.g., UDP packet), the parent process 202a will be able to correlate such data with the child process 202b in the process map 290 and store such data in association with the child process 202b (e.g., in the child tracker object 294 associated with that child process 202b).

Thus, as discussed, in parent process 202a while the run flag is set to true or while the parent process 202a is otherwise executing (STEP 210), the parent process 202a may listen (e.g., check) on any of the established socket server to determine if any sockets need servicing, including for requests on the TCP work socket (e.g., associated with requests received through a services interface), administrative requests received on the administrative channel, and sockets on the UDP server from any child processes (STEP 212). If there is a socket on the inter-process communication channel (e.g., the UDP server) (Yes branch of STEP 260), the parent process 202a may read the UDP packet (e.g., from a child process) on the UDP server (STEP 262).

The parent process 202a can then obtain the child process 202b identifier from the UDP packet read from the inter-process communication channel and update the child tracker object 294 associated with the process identifier 292 in the process map 290 with the data included in the obtained packet (STEP 264). This update may include parsing or otherwise evaluating the data included in the packet and storing the parsed data in an appropriate location in the child tracker object 294 associated with the identifier for that child process 202b. In this manner, data on the child process 202b may be tracked with a high level of granularity by the parent process 202a.

When the parent process 202a receives a UDP packet from a child process 202b with data from that child process 202b, the parent process 202a may also update a list of process that have likely exited but not yet removed from the process map (e.g., with the process identifier for the child process 202b whose data was received on the inter-process communication channel (e.g., UDP socket), but for which the corresponding child process may still be alive and in the process map 290).

The parent process 202a may also check the child processes 202b that have been forked to remove inactive children from the process map (e.g., while retaining child tracker 294 objects for those child processes) or otherwise designating these child processes 202b as dead. In particular, according to one embodiment, at some time interval (e.g., a child check time which may be 750 milliseconds or the like) (STEP 266), the parent process 202a may iterate through each of the child processes 202b included in the process map 290 (STEP 268). For example, the parent process 202a may iterate through each of the identifiers 292 for each of the child processes 202b forked. For each child process identifier 292 the parent process 202a may determine if that child process is still alive (STEP 270) (e.g., using is_alive( ) or the like).

If the child process 202b associated with the identifier 292 is still alive (Yes branch of STEP 270) the parent process 202a may move on to the next process identifier 292 if there are any more process identifiers in the list (No branch of STEP 280). Alternatively, the parent process 202a may check to see if the child process 202b has exceeded a maximum lifetime for child processes by utilizing the accepted time for the socket associated with the child process 202b stored in the child tracker object 294 for the child process 202b. If this maximum lifetime is exceeded (e.g., as determined based on the accepted time and the current time), this child process 202b may be declared dead and removed from the process map 292 (e.g., while retaining the child tracker object 294 for that child process 202b).

If, however, it is determined that that the child process 202b associated with the identifier 292 is not alive (No branch of STEP 270), it can be determined if the child tracker object 294 associated with process identifier 292 has been marked with a first dead time for the child process 202b (STEP 272). If no first dead time for the child process 202b has been noted in the child tracker object 294 (No branch of STEP 272), the current time may be stored as the first dead time in the child tracker object 294 associated with the process identifier 292 (STEP 274).

If, however, the child tracker object 294 associated with the process identifier 292 includes a first dead time (Yes branch of STEP 272), it can be determined if a dead wait time (e.g., 10 seconds or the like) has elapsed since the first dead time included in the child tracker object 294 (STEP 276). By utilizing such a dead wait time, race conditions may be avoided whereby a child process 202b has exited but data associated with that child process 202b has not been received and added to the child tracker object 294 for the child process 202b.

If the dead wait time has elapsed since the first dead time included in the child tracker object 294 (Yes branch of STEP 276), the process identifier 292 may be added to a list of identifiers of child processes to be removed (STEP 278) and if there are any more process identifiers in the list (No branch of STEP 280) the next process identifier 292 in the process map evaluated (STEP 268). Otherwise, if the dead wait time has not elapsed since the first dead time included in the child tracker object 294 (No branch of STEP 276) if there are any more process identifiers in the list (No branch of STEP 280) the next process identifier 292 in the process map may be evaluated (STEP 268). When each process identifier 292 has been evaluated (Yes branch of STEP 280), the list of process identifiers for child processes 202b to be removed may be iterated through and each of the entries in the process map 290 associated with those process identifiers 292 may be removed from the process map 292 (STEP 282).

As discussed, embodiments may also increase the granularity at which the execution of specific tasks or requests may be tracked and observed by tracking, in the parent process, data on each specific child process for each received request. This data may be data associated with the child process from the beginning to the end of the lifetime of the child process. Because the only code executing in that child process is code specific to that particular task for a particular request, it is possible to measure with very fine granularity the independent execution (e.g., the statistics or other data) related only to that request/task.

Figure 4A:
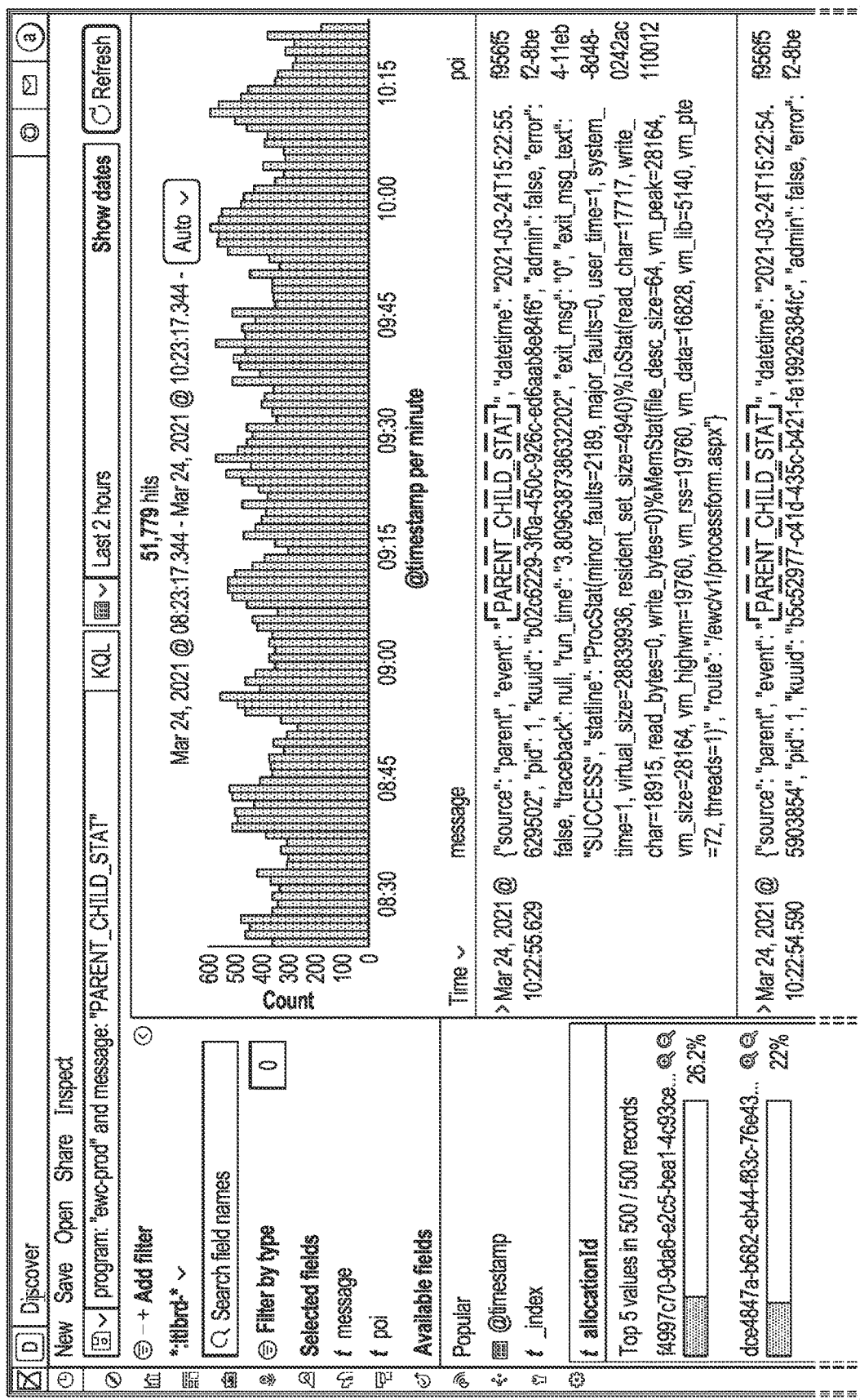
Figure 4B:
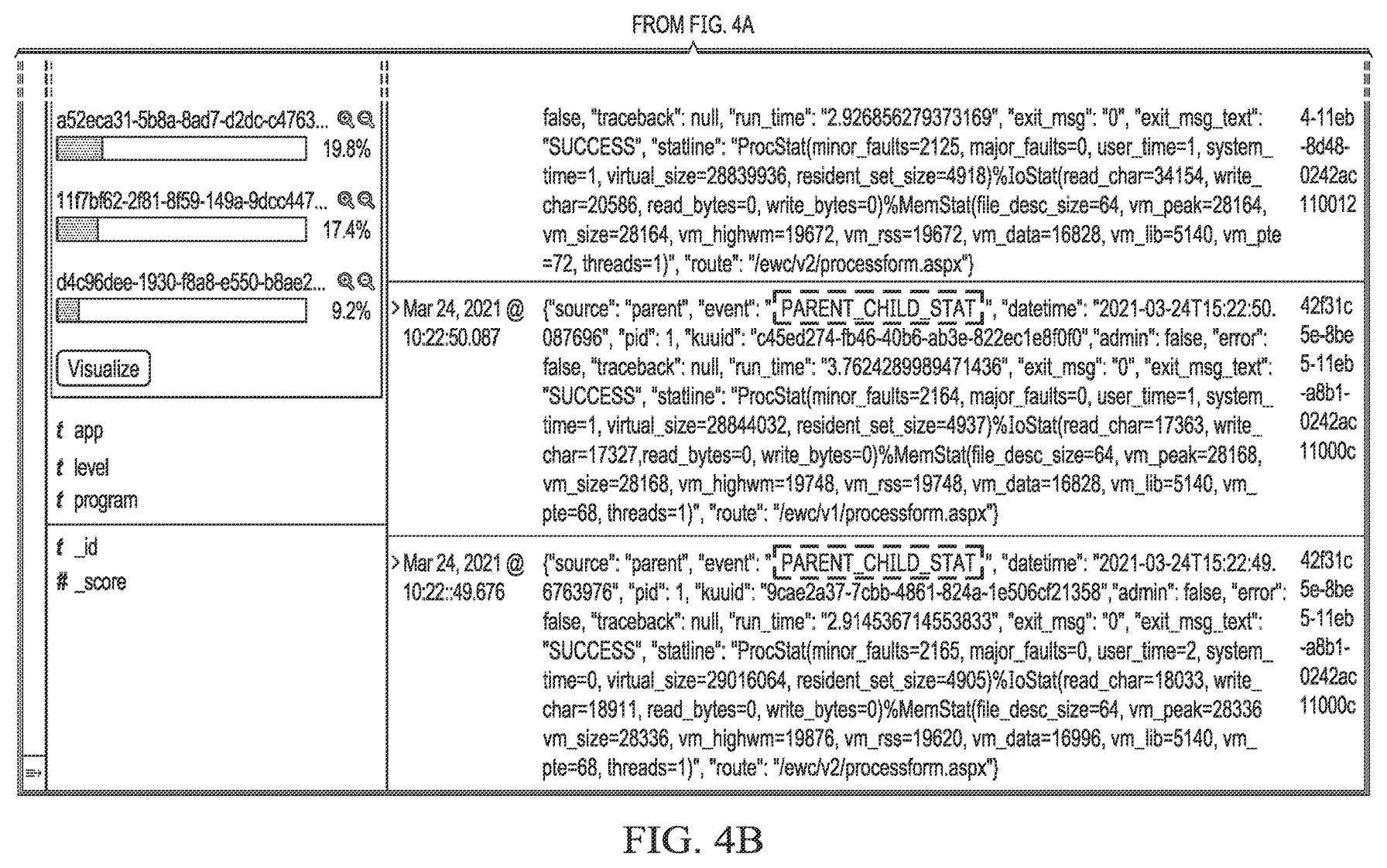
Figure 5A:
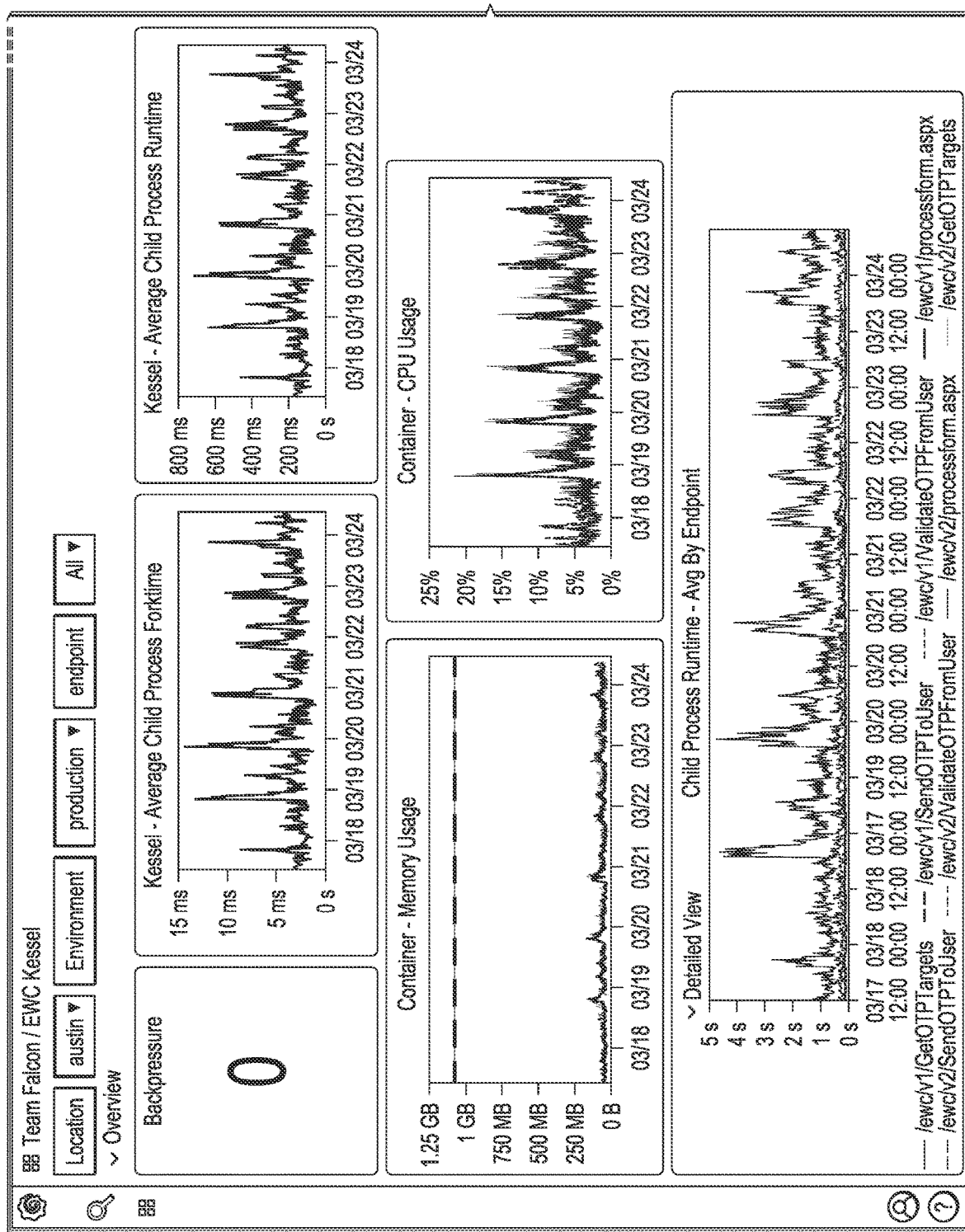
FIGS. 5A and 5B are diagrams illustrating one embodiment of an interface presenting observed data on child processes utilized by a task handler.
Figure 5B:
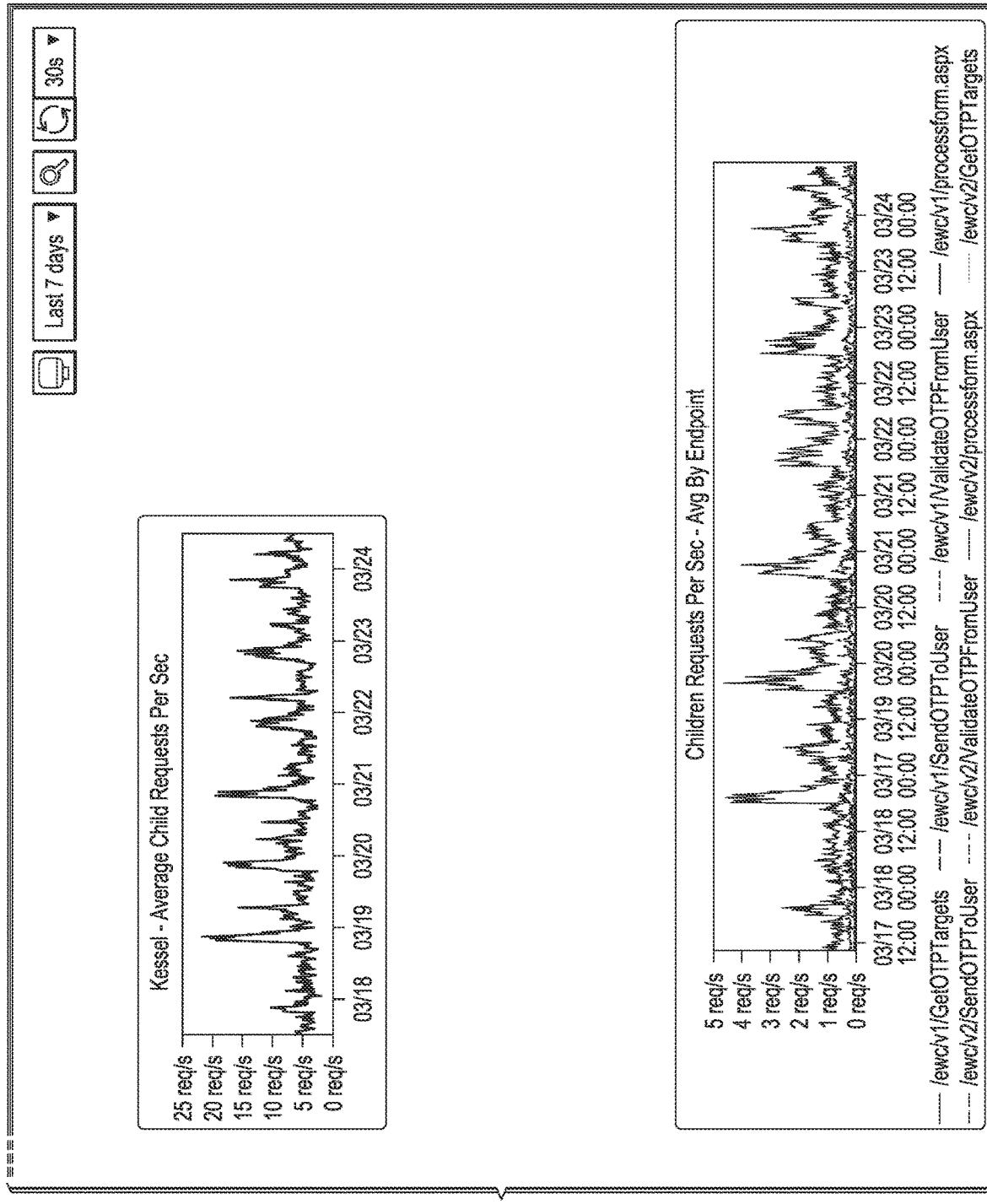

Examples of data that may be tracked for a child process and presented to an administrator or other user associated with a task handler is presented in FIGS. 4 and 5. Looking first at FIGS. 4A and 4B, one embodiment of an interface that may be utilized by embodiments to present data on child processes is depicted. Here, for example, data on multiple child processes forked to accomplish the same task for different requests. FIGS. 5A and 5B depict an embodiment of an interface that may be used to present data on a set of child processes executed with respect to an instance of a task handler (e.g., referred to here as "Kessel") deployed in a containerized environment including the respective tasks executed by those child processes.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

To the extent particular values are provided in any example embodiments in the description, such values are provided by way of example and not limitation. Moreover, while in some embodiments rules may use hardcoded values, in other embodiments rules may use flexible values. In one embodiment, one or more of the values may be specified in a registry, allowing the value(s) to be easily updated without changing the code. The values can be changed, for example, in response to analyzing system performance.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

APPENDIX

From /proc/[pid]/stat
  minflt %lu (10) The number of minor faults the process has made which have not required loading a memory page from disk.
  majflt %lu (12) The number of major faults the process has made which have required loading a memory page from disk.
  utime %lu (14) Amount of time that this process has been scheduled in user mode, measured in clock ticks (divide by sysconf(_SC_CLK_TCK)). This includes guest time, guest_time (time spent running a virtual CPU, see below), so that applications that are not aware of the guest time field do not lose that time from their calculations.
  stime %lu (15) Amount of time that this process has been scheduled in kernel mode, measured in clock ticks (divide by sysconf(_SC_CLK_TCK)).
  vsize %lu (23) Virtual memory size in bytes.
  rss %ld (24) Resident Set Size: number of pages the process has in real memory. This is just the pages which count toward text, data, or stack space. This does not include pages which have not been demand-loaded in, or which are swapped out.
From /proc/[pid]/io
  rchar: characters read: The number of bytes which this task has caused to be read from storage. This is simply the sum of bytes which this process passed to read(2) and similar system calls. It includes things such as terminal I/O and is unaffected by whether or not actual physical disk I/O was required (the read might have been satisfied from pagecache).
  wchar: characters written: The number of bytes which this task has caused, or shall cause to be written to disk. Similar caveats apply here as with rchar.
  syscr: read syscalls: Attempt to count the number of read I/O operations—that is, system calls such as read(2) and pread(2).
  syscw: write syscalls: Attempt to count the number of write I/O operations—that is, system calls such as write(2) and pwrite(2).
  read_bytes: bytes read: Attempt to count the number of bytes which this process really did cause to be fetched from the storage layer. This is accurate for block-backed filesystems.
  write_bytes: bytes written: Attempt to count the number of bytes which this process caused to be sent to the storage layer.
  cancelled_write_bytes: The big inaccuracy here may be truncate.
From proc/[pid]/status, proc/[pid]/stat or proc/[pid]/statm:
  FDSize: Number of file descriptor slots currently allocated.
  VmPeak: Peak virtual memory size.
  VmSize: Virtual memory size.
  VmHWM: Peak resident set size ("high water mark").
  VmRSS: Resident set size. Note that the value here is the sum of RssAnon, RssFile, and RssShmem.
  VmData, VmStk, VmExe: Size of data, stack, and text segments.
  VmLib: Shared library code size.
  VmPTE: Page table entries size.
  What is claimed is:
  1. A system, comprising:
    a non-transitory computer readable medium, comprising instructions for a task handler, the task handler comprising:

a parent portion adapted for executing in a parent process to:
  initialize a first task;
  receive a first request for the first task over a first connection to a first communication channel;
  accept the first request for the first task over the first connection to the first communication channel without reading data from the first request;
  create a first child process and providing the first connection to the first communication channel associated with the first request to the first child process without reading data from the first connection to the first communication channel associated with the first request, wherein the first child process is a copy of the parent process executing in a first separate process space from the parent process and the parent process configures the first child process to start execution at a child entry point associated with a child portion of the task handler;
  create a first child tracking entry associated with the first child process in a process map;
  receive first data associated with the execution of the first child process from the first child process over a second communication channel;
  store the received first data associated with the execution of the first child process in the first child tracking entry; and
the child portion of the task handler is adapted for executing in the first child process to:
  read the first request over the first connection to the first communication channel to identify the requested first task;
  invoke the identified requested first task to perform the first request;
  provide a first response to the first request directly from the first child process over the first connection to the first communication channel without involvement of the parent process;
  determine the first data associated with the execution of the first child process; and
  send the first data associated with the execution of the first child process to the parent process over the second communication channel.

2. The system of claim 1, wherein creating the first child process comprises forking the parent process.

3. The system of claim 1, wherein the first communication channel and the second communication are different.

4. The system of claim 3, wherein the first communication channel is a TCP channel and the second communication channel is a UDP channel.

5. The system of claim 1, wherein the parent portion is further adapted for executing in the parent process to:
  receive a second request for a second task over a second connection to the first communication channel;
  accept the second request for the second task over the second connection to the first communication channel without reading data from the second request;
  create a second child process and provide the second connection to the first communication channel associated with the first request to the second child process without reading data from the second connection to the first communication channel associated with second request, wherein the second child process is a copy of the parent process executing in a second separate process space from the parent process and the parent process configures the second child process to start execution at the child entry point associated with the child portion of the task handler;
  create a second child tracking entry associated with the second child process in the process map;
  receive second data associated with the execution of the second child process from the second child process over the second communication channel;
  store the received second data associated with the execution of the second child process in the second child tracking entry; and
the child portion of the task handler is adapted for executing in the second child process to:
  read the second request over the second connection to the first communication channel to identify the requested second task;
  invoke the identified second task to perform the second request;
  provide a second response to the second request directly from the second child process over the second connection to the first communication channel without involvement of the parent process;
  determine the second data associated with the execution of the second child process; and
  send the second data associated with the execution of the second child process to the parent process over the second communication channel.

6. The system of claim 5, wherein the second task is different than the first task.

7. The system of claim 1, wherein first data associated with execution of the first child process comprises memory usage statistics, I/O statistics, or timing statistics on the first child process obtained from an operating system by the first child process.

8. A non-transitory computer readable medium, comprising instructions for:
  a task handler, the task handler comprising:
  a parent portion adapted for executing in a parent process to:
    initialize a first task;
    receive a first request for the first task over a first connection to a first communication channel;
    accept the first request for the first task over the first connection to the first communication channel without reading data from the first request;
    create a first child process and providing the first connection to the first communication channel associated with the first request to the first child process without reading data from the first connection to the first communication channel associated with first request, wherein the first child process is a copy of the parent process executing in a first separate process space from the parent process and the parent process configures the first child process to start execution at a child entry point associated with a child portion of the task handler;
    create a first child tracking entry associated with the first child process in a process map;
    receive first data associated with the execution of the first child process from the first child process over a second communication channel;
    store the received first data associated with the execution of the first child process in the first child tracking entry; and
  the child portion of the task handler is adapted for executing in the first child process to:

read the first request over the first connection to the first communication channel to identify the requested first task;
invoke the identified requested first task to perform the first request;
provide a first response to the first request directly from the first child process over the first connection to the first communication channel without involvement of the parent process;
determine the first data associated with the execution of the first child process; and
send the first data associated with the execution of the first child process to the parent process over the second communication channel.

9. The non-transitory computer readable medium of claim 8, wherein creating the first child process comprises forking the parent process.

10. The non-transitory computer readable medium of claim 8, wherein the first communication channel and the second communication are different.

11. The non-transitory computer readable medium of claim 10, wherein the first communication channel is a TCP channel and the second communication channel is a UDP channel.

12. The non-transitory computer readable medium of claim 8, wherein the parent portion is further adapted for executing in the parent process to:
receive a second request for a second task over a second connection to the first communication channel;
accept the second request for the second task over the second connection to the first communication channel without reading data from the second request;
create a second child process and provide the second connection to the first communication channel associated with the first request to the second child process without reading data from the second connection to the first communication channel associated with second request, wherein the second child process is a copy of the parent process executing in a second separate process space from the parent process and the parent process configures the second child process to start execution at the child entry point associated with the child portion of the task handler;
create a second child tracking entry associated with the second child process in the process map;
receive second data associated with the execution of the second child process from the second child process over the second communication channel;
store the received second data associated with the execution of the second child process in the second child tracking entry; and
the child portion of the task handler is adapted for executing in the second child process to:
read the second request over the second connection to the first communication channel to identify the requested second task;
invoke the identified second task to perform the second request;
provide a second response to the second request directly from the second child process over the second connection to the first communication channel without involvement of the parent process;
determine the second data associated with the execution of the second child process; and
send the second data associated with the execution of the second child process to the parent process over the second communication channel.

13. The non-transitory computer readable medium of claim 12, wherein the second task is different than the first task.

14. The non-transitory computer readable medium of claim 8, wherein first data associated with execution of the first child process comprises memory usage statistics, I/O statistics, or timing statistics on the first child process obtained from an operating system by the first child process.

15. A method, comprising:
providing a task handler, the task handler comprising:
a parent portion adapted for executing in a parent process to:
initialize a first task;
receive a first request for the first task over a first connection to a first communication channel;
accept the first request for the first task over the first connection to the first communication channel without reading data from the first request;
create a first child process and providing the first connection to the first communication channel associated with the first request to the first child process without reading data from the first connection to the first communication channel associated with first request, wherein the first child process is a copy of the parent process executing in a first separate process space from the parent process and the parent process configures the first child process to start execution at a child entry point associated with a child portion of the task handler;
create a first child tracking entry associated with the first child process in a process map;
receive first data associated with the execution of the first child process from the first child process over a second communication channel;
store the received first data associated with the execution of the first child process in the first child tracking entry; and
the child portion of the task handler is adapted for executing in the first child process to:
read the first request over the first connection to the first communication channel to identify the requested first task;
invoke the identified requested first task to perform the first request;
provide a first response to the first request directly from the first child process over the first connection to the first communication channel without involvement of the parent process;
determine the first data associated with the execution of the first child process; and
send the first data associated with the execution of the first child process to the parent process over the second communication channel.

16. The method of claim 15, wherein creating the first child process comprises forking the parent process.

17. The method of claim 15, wherein the first communication channel and the second communication are different.

18. The method of claim 17, wherein the first communication channel is a TCP channel and the second communication channel is a UDP channel.

19. The method of claim 15, wherein the parent portion is further adapted for executing in the parent process to:
receive a second request for a second task over a second connection to the first communication channel;
accept the second request for the second task over the second connection to the first communication channel without reading data from the second request;

create a second child process and provide the second connection to the first communication channel associated with the first request to the second child process without reading data from the second connection to the first communication channel associated with second request, wherein the second child process is a copy of the parent process executing in a second separate process space from the parent process and the parent process configures the second child process to start execution at the child entry point associated with the child portion of the task handler;

create a second child tracking entry associated with the second child process in the process map;

receive second data associated with the execution of the second child process from the second child process over the second communication channel;

store the received second data associated with the execution of the second child process in the second child tracking entry; and the child portion of the task handler is adapted for executing in the second child process to:

read the second request over the second connection to the first communication channel to identify the requested second task;

invoke the identified second task to perform the second request;

provide a second response to the second request directly from the second child process over the second connection to the first communication channel without involvement of the parent process;

determine the second data associated with the execution of the second child process; and send the second data associated with the execution of the second child process to the parent process over the second communication channel.

20. The method of claim 19, wherein the second task is different than the first task.

21. The method of claim 15, wherein first data associated with execution of the first child process comprises memory usage statistics, I/O statistics, or timing statistics on the first child process obtained from an operating system by the first child process.

* * * * *